B. F. Nave.

Bee Hive

N° 82,628.    Patented Sep. 29, 1868.

WITNESSES:
C. N. Brown
W. Kilner

INVENTOR:
B. F. Nave.
per
Geo. E. Brown
attorney

United States Patent Office.

BENJAMIN F. NAVE, OF FORT WAYNE, INDIANA.

Letters Patent No. 82,628, dated September 29, 1868.

IMPROVEMENT IN BEE-HIVES.

The Schedule referred to in these Letters Patent and making part of the same.

TO ALL WHOM IT MAY CONCERN:

Be it known that I, BENJAMIN F. NAVE, of Fort Wayne, in the county of Allen, and State of Indiana, have invented certain new and useful Improvements in Bee-Hives; and I do hereby declare that the following is a full, clear, and exact description thereof, reference being had to the accompanying drawings, and to the letters of reference marked thereon, in which—

Figure 1:
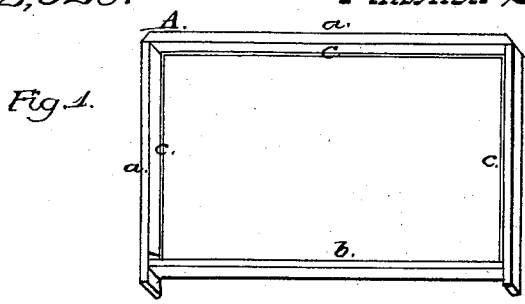
Figure 2:
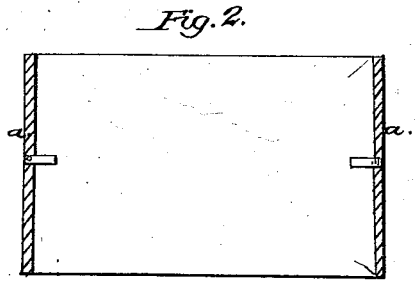
Figure 3:
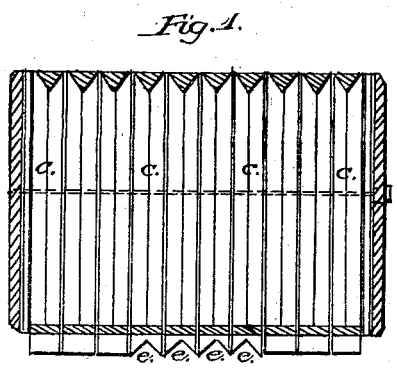

Figure 1 is a vertical section.
Figure 2, an end view.
Figure 3, a detached view of the frame.

The nature of my invention consists in constructing bee-hives. Said improvements relate more particularly to the method of constructing the box or case, which is composed of a series of frames placed side by side, and united together by means of rods or other suitable device, as will be hereafter more fully described.

To enable others skilled in the arts to make and use my invention, I will proceed to describe its construction and use.

A, fig. 3, represents a frame, constructed in the manner there shown, by uniting three strips, $a\ a\ a$, of a suitable width and thickness, and tying them together near the bottom by means of another narrow strip, $b$, as seen in the drawings.

To the inside of the frames are secured prismatic strips, $c$, which extend, from the ends of the tie, the whole distance around the space occupied by the frame. These prismatic strips are narrower than the strips composing the frame, but are of exactly the same width as the tie $b$.

The lower ends of the frame at $d$ are chamfered, so as to give them as little bearing-surface as possible, where moths might shelter themselves.

Three or four of these frames are notched, as seen at $e$, figs. 1 and 3, to admit the passage of the bees.

When these frames are constructed, they are placed side by side, so as to form a series of frames, which make the box, as seen in fig. 1, and are secured temporarily together by a rod, $x$, of iron, passed transversely through the box, upon the end of which is a nut, $x'$, which, when screwed on the rod $x$, against the frames, securely holds them, and, when turned back on the rod, away from the frames, loosens them.

The bees are then admitted to the hive, the ends having first been secured by inserting a glass, covered by a board, to render it sufficiently warm and exclude the light. They then immediately glue all the cracks or seams, which should form good, snug joints, and thus perfectly cement the frames together, so as to form one entire mass or box, which will, under all circumstances, support itself.

Having thus fully described its construction, I will now set forth the operation and advantage of the same.

It will be readily seen that a complete hive is thus readily constructed, having all the advantages of the most approved hives in relation to the formation of the comb, which is attached to and suspended from the angle of the prismatic strips, and is thus rendered straight, while the intervals between them prevents the comb from becoming crowded and attached together. When desirable, additional frames may be attached, thus increasing the size of the hive to a non-swarmer. Or frames with comb may be taken off for present use at any time without disturbing the hive. When it becomes necessary to remove one or more of the frames, a sheet of tin may be inserted between the frames, after first loosening them, and forced down between the comb, and the bees in that way are prevented from coming out. Those that remain on the detached comb may be removed without injury, and the end closed up as before.

What I claim as new, and desire to secure by Letters Patent, is—

The frame A, constructed as described, and secured together by means of the rod $x$ and nut $x'$, as shown and described, for the purpose set forth.

BENJ. F. NAVE. [L. S.]

Witnesses:
H. F. WILLSON,
ALLEN ZOLLARS.